United States Patent [19]

Brosnan et al.

[11] Patent Number: 5,562,765
[45] Date of Patent: Oct. 8, 1996

[54] IRON-MANGANESE COLORANT

[75] Inventors: Denis A. Brosnan, Clemson, S.C.; Cary V. Brown, Waverly, Tenn.

[73] Assignee: E. I. Du Pont de Nemours and Company, Wilmington, Del.

[21] Appl. No.: 327,255

[22] Filed: Oct. 21, 1994

[51] Int. Cl.$^6$ .............................. C09C 1/14; C09C 1/62
[52] U.S. Cl. ...................... 106/459; 106/712; 501/141; 423/593; 423/594; 423/599
[58] Field of Search .................................. 106/459, 712, 106/903; 423/594, 599, 593; 501/141, 144

[56] References Cited

U.S. PATENT DOCUMENTS

| | | | |
|---|---|---|---|
| 3,382,174 | 5/1968 | Hund | 106/459 |
| 3,615,810 | 10/1971 | Krefeld et al. | 106/304 |
| 3,655,418 | 4/1972 | Hardy et al. | 106/459 |
| 3,822,210 | 7/1974 | Iwase et al. | 252/62.64 |
| 3,844,812 | 10/1974 | Fishwick | 106/316 |
| 4,145,229 | 3/1979 | Ferrero et al. | 106/304 |
| 4,289,745 | 9/1981 | Patil | 106/459 |
| 4,911,760 | 3/1990 | Burow et al. | 106/459 |
| 4,962,006 | 10/1990 | Oat | 428/703 |
| 5,154,769 | 10/1992 | Kuske et al. | 106/459 |
| 5,164,005 | 11/1992 | Kuske et al. | 106/459 |
| 5,164,007 | 11/1992 | Buxbaum | 106/459 |
| 5,199,986 | 4/1993 | Krockert et al. | 106/712 |
| 5,215,584 | 6/1993 | Buxbaum et al. | 106/712 |
| 5,269,841 | 12/1993 | Kuske et al. | 106/456 |

FOREIGN PATENT DOCUMENTS

| | | |
|---|---|---|
| 482450 | 4/1992 | European Pat. Off. . |
| 4210501 | 8/1993 | Germany . |
| 1530740 | 11/1978 | United Kingdom . |

Primary Examiner—Mark L. Bell
Assistant Examiner—Michael Marcheschi

[57] ABSTRACT

A process for preparing an iron-manganese colorant, from an aqueous media containing metal ions, having an effective amount of iron and manganese present to impart color to building materials is disclosed.

7 Claims, No Drawings

IRON-MANGANESE COLORANT

BACKGROUND OF THE INVENTION

This invention relates to a process for preparing an iron-manganese colorant, from an aqueous media containing metal ions, having an effective amount of iron and manganese present to impart color to building materials such as bricks, ceramic tiles, paving shapes, concrete block and other functional building units.

Large amounts of metal chlorides arise as by-products from various industrial processes. For example, in a chloride process for making $TiO_2$, titanium bearing material or ore is chlorinated to produce $TiCl_4$ and other metal chloride by-products. The metal chloride by-products are highly acidic and often contain iron chlorides as a major ingredient as well as manganese chloride. Many processes to treat these materials are expensive and produce a product that must still be disposed of by neutralization, landfilling, deepwelling or other disposal methods.

The need therefore exists for a process for treating aqueous media containing metal ions that produces saleable products.

Iron oxides or iron hydroxides are used in ceramic products for the building industry as red, black, brown or yellow pigments and manganese oxides as brown-black pigments. A combination of iron and manganese oxides can be used to impart dark red to brown or even black colors to ceramic materials including bricks. For example, U.S. Pat. No. 3,276,894 discloses oxidation of iron with aromatic nitro compounds in the presence of Fe(II) salt solutions and/or suspensions of hydrolyzable salts, oxides or hydroxides and further in the presence of manganese compounds or metal. Therein, an expensive, high temperature calcination step is required to form a metal oxide pigment. Further, there is neither disclosure therein of metal hydroxide pigments nor metal carbonate pigments.

SUMMARY OF THE INVENTION

In accordance with this invention there is provided a process for producing an iron-manganese colorant having an effective amount of iron and manganese present to impart color to building materials, comprising the steps of:

(a) recovering precipitates comprising metal carbonates, metal hydroxides, metal hydrated oxides, and mixtures thereof from aqueous media containing metal ions;

(b) dewatering the precipitates.

It has been found that the process of this invention produces saleable product. The iron-manganese colorant is useful in the manufacture of building materials including bricks, ceramic tiles, paving shapes, concrete block and other functional building units, and provides a more economical, substantially effective, flexible colorant alternative without adversely affecting the properties of the building materials. Further, the process avoids the costly calcination step and need for additives used in many of the prior art processes. A by-product stream of the aqueous media containing metal ions provides one additive, that is, iron and manganese from the same source, and by varying the amount of iron-manganese colorant in brick formulations, desired brick colors may be obtained. Yet another advantage is iron-manganese colorant may eliminate the need for "flashing", as defined below, a process often used by brick manufacturers to produce a black color.

DETAILED DESCRIPTION

Step (a)

Step (a) of the process of the present invention entails recovering precipitates comprising metal carbonates, metal hydroxides and mixtures thereof from aqueous media containing metal ions. The precipitates further comprise water often in the amount of about 70 to about 95%. The metal carbonates are comprised of iron carbonate and manganese carbonate. The metal hydroxides are comprised of iron hydroxide and manganese hydroxide. The metal hydrated oxides are comprised of iron hydrated oxide.

Iron-manganese colorant is derived from titanium bearing material or ores which contain iron, manganese and other constituents and originates from aqueous media by product stream containing metal ions. Several current industrial processes produce by-product streams which are comprised of metal chlorides, salts and other materials in aqueous solution or suspension and include, but are not limited thereto, the chloride process for making titanium dioxide (as described in greater detail in U.S. Pat. No. 2,488,439 and U.S. Pat. No. 2,488,440, the teachings of which are incorporated herein by reference), cleaning processes of iron, steel or other metals. For example, in a copending, commonly-assigned U.S. Patent Application entitled "PROCESS FOR TREATING AQUEOUS MEDIA CONTAINING METAL IONS", the teachings of which are incorporated herein by reference, the aqueous media are treated by:

(1) contacting the aqueous media, at a pH of about 1–5 with an effective amount of product recycled from step (2) to dissolve at least some metal carbonates, produce at least some $CO_2$, convert at least some metal ions having a valence of at least +3 to metal hydroxide precipitates, and neutralize some acid, if present;

(2) contacting the product of step (1), at a pH of about 4–8.5, with an effective amount of $Na_2CO_3$ to convert at least some metal ions of +2 valence to metal carbonate precipitates and form at least some dissolved sodium salts;

(3) recovering, from a portion of the product from step (2) that is not recycled, metal carbonates, metal hydroxides and sodium salts.

A number of different alkaline materials, in addition to the carbonates, can be used to precipitate the metal carbonates, metal hydroxides, metal hydrated oxides and mixtures thereof and include but not limited thereto, lime, alkali and alkaline earth metal oxides, hydroxides and mixtures thereof.

Another method of recovering precipitates comprising metal hydroxide and metal hydrated oxides is from a process of treating aqueous media containing metal ions with a hydrated lime $(Ca(OH)_2)$ slurry at a pH of about 7–10, typically at a pH of about 8.5–9.5, to produce $CaCl_2$, metal hydroxides and metal hydrated oxides. An aqueous media comprising metal ions may be subjected to a separating operation to remove coke and ore solids after chlorination of titanium-bearing material or ore, and the aqueous media comprising metal ions is then treated in an one stage neutralizer with a hydrated lime as described above resulting in metal hydroxides and metal hydrated oxides being formed. This process is referred herein as a lime precipitation process after chlorination of titanium bearing materials or ores.

Depending on the ore selected, it will determine the iron and manganese content. The brick color will vary depending on the manganese to iron content. The manganese to iron content is amount of manganese divided by iron expressed as a percentage. Typically, the manganese to iron content is about 2 to about 52%, preferably about 4 to about 24% and more preferably about 8 to about 16% to obtain the desired brick colors. The desired brick color may also be obtained by varying the amount of iron-manganese colorant added to the building materials. Metal carbonates, metal hydroxides, metal hydrated oxides or mixtures thereof can be recovered by precipitating the by-product stream using alkaline material including, but not limited thereto, lime, alkali and alkaline earth metal oxides, hydroxides, and carbonates and mixtures thereof as described above. Thereafter, the mixture of metal hydroxides and metal hydrated oxides, or mixture metal hydroxides and metal carbonates will be suspended in either $CaCl_2$ and $H_2O$, or $NaCl$ and $H_2O$, respectively.

Step (b)

Step (b) of the process of this invention entails dewatering the precipitates. Any type of standard liquid/solid separation technique is contemplated. For example, a centrifuge, gravity settler, vacuum filter, filter with membrane press or the like is applicable with a centrifuge being preferred when carbonate precipitated procedure is used and a plate and frame filter with membrane press being preferred when lime precipitated procedure is used. When the dewatering is conducted with a centrifuge, a two-step separation is preferred. For example, the precipitates are centrifuged from about 1600 to 2000 G in about 5 seconds to 2 minutes to bring the solids content to about 30 to about 70%, preferably about 40 to about 65%. Next, the precipitates are repulped with water for washing to lower the salt content. Finally, the precipitates are centrifuged to bring the solids content to about 30 to about 70%, preferably about 40 to about 65%. Alternatively, in the lime precipitated procedure, the treated slurry is filtered with the plate and frame filter with membrane presses where the $CaCl_2$ and water are separated from the metal hydroxide precipitates.

A drying step is optional so that the solids content ranges from about 70 to about 100%, preferably about 75 to about 85%. Any type of drying method is contemplated, for example, a rotary dryer or the like may be used. Drying under ambient conditions is preferred for the lime precipitation process.

A further optional step is reducing the particle size of the solids to less than about 8–10 mesh by crushing.

Iron-Manganese Colorant Addition

Although broader applications are contemplated, the general procedure for adding iron-manganese colorant to bricks as a body addition is described. A skilled artisan may substitute the iron-manganese colorant of the present invention as a colorant replacement for the desired application. For example, brick clays can be of almost any clay composition as long as the clay is: (1) present in sufficient quantity for large scale development; (2) has sufficient plasticity to be formed into a shape; and (3) vitrify sufficiently at 950°–1100° C. to form hard bricks without excessive shrinkage or deformation. As a body addition, the iron-manganese colorant is mixed with clay to color substantially throughout the brick. Brick clay raw materials that can be used in the process include, but are not limited thereto, shale based, montmorillonite based and the like. The iron-manganese colorant can be of the variety produced as described above. Optionally, moisture adjustment of the brick clay raw materials can be performed. The brick clay raw material and the iron-manganese colorant are continuously mixed in a pug mill. The weight range of the iron-manganese colorant will vary depending on the desired brick color. Often, iron-manganese colorant will be added in about 0.5 to about 50 wt %, preferably about 1 to about 10 wt %, and more preferably about 1 to about 5 wt %, based on the total weight of the brick composition.

The brick clay-iron-manganese admixture can be transferred into any type of vacuum extrusion machine of the piston or auger type such as a deairing extrusion machine (available from the J. C. Steele Company of Statesville, N.C. or from Fate Root Heath, Pittsburgh, Pa.). The admixture is extruded through a die to form small test bars or bricks. The bricks are characterized by measurement of extruder amps, vacuum, and penetrometer readings. Brick may also be plastic pressed or molded.

Bars or bricks after forming are typically initially dried or conditioned at a low temperature (about 79° C.). Bricks are next transferred to a dryer which typically employs waste heat from ceramic kilns. Drying cycles can involve temperatures up to about 177° C. with cycles extending to about 48 hours. Bricks are transferred to gas or solid fuel fired kilns which typically feature a carbon oxidation hold at about 760° C. for several hours with continued heating to a soak temperature of about 950°–1100° C. with a hold for up to eight hours prior to cooling for a period of time depending on the requirements of the clay raw material. The metal hydroxides and metal carbonates are oxidized to corresponding metal oxides during the firing process.

Color is an essential property of brick from a commercial perspective. As understood in the art, iron oxide colors clay ceramics depending on its concentration, its chemical valence, and whether it reacts with other substances such as lime which may be present. If iron oxide is substantially present as ferric iron oxide or hematite ($Fe_2O_3$), the clay ceramic product usually exhibits a red color. If some or all of the iron oxide is reduced to ferrous iron oxide or wustite (FeO), dark colors are produced. The presence of wustite and hematite together results in formation of magnetite ($Fe_3O_4$), which produces a black color. Ceramic producers can manipulate the oxidation conditions during the firing process. If reducing conditions are purposefully created, the process is called "flashing". Flashing however, is difficult to control causing the manufacturer to have difficulty in matching colors from run to run of product. Most brick clays in the prior art contain about 4 to 8% iron oxides, and when fired produce red colors. Many brick clays or clay blends with less than about 4% iron oxide fire off-white or white colors. This may necessitate additions of iron oxides to produce red colors (or black with flashing) or manganese oxides to produce brown colors. To achieve brown colors, buff firing clay mixes in the prior art are used with manganese oxide additions of about 2.5 to 4% of the total batch weight. In the present invention, often the carbonate precipitated material contains more magnetite and therefore produces darker colors or black colors. Often, the lime precipitated material contains more hematite and tends to produce red colors. The presence of calcium in the lime precipitated materials tends to lighten colors.

Ceramic products may be colored using semivitreous coatings called "engobes" and vitreous coatings known as "glazes". Oxide colorants with very small particle size color the glass in the coating. Oxide colorants of coarse particle size provide color by providing distinct color spots on the surface of the coating.

In an alternative embodiment, the iron-manganese colorant may be mixed with brick day, ball clay and water to provide an aqueous slurry or engobe that can be applied to the surface of shaped ceramic or clay materials such as bricks in an unfired state. Engobes are typically clay slurries incorporating coloring oxides which are applied to the fleshly extruded or molded brick providing for permanent color and texture after the bricks are fired. Similarly, the weight range of the iron-manganese colorant will vary depending on the desired brick color. Often, iron-manganese colorant will be added in about 0.5 to about 50 wt %, preferably about 1 to about 30 wt %, and more preferably about 5 to about 15 wt %, based on the total weight of the engobe.

The following Examples are construed as illustrative and not limitative of the disclosure in any way whatsoever.

EXAMPLES

Table 1 provides descriptions of the compositions for Examples 1 to 13. In Tables 1 and 8, iron-manganese colorants were produced by either the "C" carbonate or "L" lime precipitation processes. In general, the carbonate precipitation process can be used to prepare the iron-manganese colorant and involves recovering precipitates comprising metal carbonates and metal hydroxides from a $TiO_2$ by-product stream in accordance with the teachings of "Process for Treating Aqueous Media Containing Metal Ions", as described above. The precipitates are dewatered in a centrifuge (Bird Model 1350) at about 1900 G for about 20 seconds to bring the solids content to about 40–65%. The solids are washed using 1 gallon of water per 10 pounds of feed cake to reduce the salt content and then subjected to a centrifuge at about 1900 G for about 37 seconds to bring the solids content to about 60%.

In general, the lime precipitation process can be used to prepare the iron-manganese colorant and involves treating a $TiO_2$ by-product stream containing metal ions with about 15% of $Ca(OH)_2$ slurry at a pH of about 9. The slurry is filtered with membrane presses to bring the solids content to about 50 to about 60% where $CaCl_2$ and water are separated from the iron hydroxides and manganese hydroxides.

In Tables 3, 6 and 9, the footnotes are as follows:

[1]Linear firing shrinkage
[2]24 hour cold water absorption
[3]5 hour boiled water absorption
[4]Cold water absorption/Boiled water absorption= "saturation coefficient".
[5]Modulus of rupture= flexure strength, one data point.
[6]Color rating was by visual estimate using the following scale:
0= salmon; 1= red; 2= dark red; 3= brown-black; 4= dark brown-black; 5= black.

and described in greater detail below under "Description of ASTM Tests".

Properties were determined in tests similar to those described in ASTM C67–91, "Standard Test Methods of Sampling and Testing Brick and Structural Clay Tile"; ASTM C373–88, "Standard Test Methods for Water Absorption, Bulk Density, Apparent Porosity, and Apparent Specific Gravity of Fired Whiteware Products"; ASTM C426–70, "Standard Test Method for Drying Shrinkage of Concrete Block"; and ASTM C531–85, "Standard Test Method for Linear Shrinkage and Coefficient of Thermal Expansion of Chemical-Resistant Mortars, Grouts and Monolithic Surfacings".

TABLE 1

Examples 1 to 13

| Example No. | Iron-Manganese Material | Percent[1] | Clay |
|---|---|---|---|
| 1 | C | 5 | Knoxville |
| 2 | C | 10 | Knoxville |
| 3 | C | 25 | Knoxville |
| 4 | C | 30 | Knoxville |
| 5 | C | 50 | Knoxville |
| 6 | L | 5 | Knoxville |
| 7 | L | 10 | Knoxville |
| 8 | — | 0 | Knoxville |
| 9 | C | 5 | Merry |
| 10 | C | 10 | Merry |
| 11 | L | 5 | Merry |
| 12 | L | 10 | Merry |
| 13 | — | 0 | Merry |

[1]% of iron-manganese colorant in the brick composition based on the total weight of the composition.

EXAMPLES 1–5

The following procedure summarizes the process for preparing bricks of Examples 1–5. The procedure provides a lab schedule which mimics an industrial process.

Knoxville Clay (shale based raw material available from General Shale Products, Knoxville, Tenn.) was adjusted to 16% moisture content. Carbonate precipitated iron-manganese colorant, as described above, in an amount of 5 to 50% by weight was added and mixed until a constant clay consistency was obtained with the Knoxville clay. The manganese to iron content was about 5.2%.

After mixing, the clay mass was inserted into an extrusion chamber of a vacuum extruder of the auger type (laboratory deairing FRH machine available from Fate Root Heath, Pittsburgh, Pa.) and extruded through a die into 1"×1"×6" inch bars. The product bricks were characterized by measurements of extruder amps, vacuum and penetrometer readings.

After the bricks were removed from the extruder, they were air dried for 24 hours at room temperature. The bricks were then placed in a forced convection dryer at 30° C. and the temperature of the dryer was increased by 10° C./hour to 110° C. The temperature was held at 110° C. for a minimum of 24 hours. After drying, while still hot, the bricks transferred to an electric furnace and fired in an air atmosphere by the following process. The furnace containing the bricks was heated to 760° C. in 10 hours. The temperature of the furnace was held at 760° C. for 10 hours. The furnace was then immediately heated to the maximum temperature either at 993° or 1021° C. for the appropriate clay in four hours. The bricks were held at the maximum temperature in the furnace for one hour.

The bricks were subject to test procedures for bricks in accordance with ASTM C-67 and C-20 adapted for the small specimen size. Table 2 presents the results from the extrusion process. Table 3 presents the properties of the resulting bricks. Table 4 presents toxicity leaching data (TCLP: Toxicity Characteristics Leaching Procedure from the EPA, Federal Register, 40 CFR 250 Appendix II). In addition, no scumming or deposition of soluble material on the surface of the clay brick when dried, was observed in any of the bricks produced in the Examples 1 to 15.

TABLE 2

Extrusion Data for Knoxville Clay with Iron-Manganese colorant

| Example | 1 | 2 | 3 | 4 | 5 |
|---|---|---|---|---|---|
| iron-manganese colorant, % | 5 | 10 | 25 | 30 | 50 |
| FRH Extruder Amps | 3 | 3 | 3 | 2.7 | 2.7 |
| Vacuum, In Hg | 21 | 25 | 22 | 26 | 26 |
| Penetrometer, kg/cm$^2$ | 2.4 | 1.3 | 1.4 | 1.0 | 0.8 |

TABLE 3

Properties of Bricks Prepared from Knoxville Clay with Iron-Manganese Colorant

| Example | 1 | 2 | 3 | 4 | 5 |
|---|---|---|---|---|---|
| Dry shrinkage, % | 3.8 | 3.9 | 3.6 | 3.2 | 2.7 |
| LF shrinkage, %[1] | 3.8 | 4.8 | 7.7 | 9.2 | 10.5 |
| CW absorption, %[2] | 9.9 | 9.3 | 6.6 | 5.7 | 7.3 |
| BW absorption, %[3] | 13.0 | 12.3 | 9.4 | 8.4 | 9.6 |
| C/B[4] | 0.77 | 0.75 | 0.70 | 0.68 | 0.76 |
| Bulk density, g/cc | 1.99 | 2.05 | 2.22 | 2.30 | 2.36 |
| Apparent porosity, % | 25.8 | 25.3 | 21.0 | 19.2 | 22.7 |
| MOR, lb/in 2[5] | 1209 | 1320 | 2855 | 1524 | 3072 |
| Color[6] | 1 | 2 | 3 | 3 | 4 |

TABLE 4

TCLP Data With Values Given In Parts Per Million

| | Example | | | |
|---|---|---|---|---|
| Metal | 2 | 3 | 4 | 5 |
| As | 0.00376 | 0.0034 | 0.0024 | 0.0026 |
| Ba | 0.152 | 0.304 | <0.404 | 0.432 |
| Cd | <0.01 | <0.01 | <0.01 | <0.01 |
| Cr | <0.05 | <0.03 | <0.03 | <0.03 |
| Pb | <0.05 | <0.05 | <0.05 | <0.05 |
| Hg | <0.0002 | <0.0002 | <0.0002 | <0.0002 |
| Se | <0.002 | <0.001 | <0.001 | <0.001 |
| Ag | <0.01 | <0.01 | <0.01 | <0.01 |

EXAMPLES 6–7

The procedure for Examples 1 to 5 was repeated using Knoxville clay and lime precipitated iron-manganese colorant, as described above, in an amount of 5 and 10% by weight. The manganese to iron content was about 4 to about 8%.

Table 5 presents the extrusion data. Table 6 presents properties of the bricks. Table 7 presents some toxicity leaching data.

COMPARATIVE EXAMPLE 8 (C8)

The procedure for Examples 1 to 5 was repeated using Knoxville clay with the exception that no iron-manganese colorant was added to the clay mixing before extruding the bricks or at any other time in the process. Comparison data is included in Tables 5, 6, and 7.

TABLE 5

Extrusion Data for Knoxville Clay with Iron Rich Colorant (lime precipitated)

| Example | 6 | 7 | C8 |
|---|---|---|---|
| iron-manganese colorant, % | 5 | 10 | 0 |
| FRH Extruder Amps | 3 | 3 | 3 |
| Vacuum, in HG | 21 | 22 | 21 |
| Penetrometer, kg/cm$^2$ | 2.7 | 2.2 | 3.5 |

TABLE 6

Properties of Bricks Prepared from Knoxville Clay with Iron-Manganese Colorant

| Example | 6 | 7 | C8 |
|---|---|---|---|
| Dry shrinkage, % | 4.4 | 4.9 | 4.0 |
| LF shrinkage, %[1] | 6.4 | 4.0 | 5.3 |
| CW absorption, %[2] | 4.8 | 10.7 | 5.5 |
| BW absorption, %[3] | 7.9 | 13.4 | 8.4 |
| C/B[4] | 0.80 | 0.61 | 0.66 |
| Bulk density, g/cc | 2.21 | 1.99 | 2.17 |
| Apparent porosity, % | 17.5 | 26.7 | 18.2 |
| MOR, lb/in 2[5] | 1729 | 1447 | 2002 |
| Color[6] | 2 | 2 | 0 |

TABLE 7

TCLP Data With Values Given Parts Per Million

| | Example | |
|---|---|---|
| Metal | 7 | C8 |
| As | 0.010 | <0.002 |
| Ba | <0.10 | 0.168 |
| Cd | <0.01 | <0.01 |
| Cr | <0.05 | <0.05 |
| Pb | <0.05 | <0.05 |
| Hg | <0.0002 | <0.0002 |
| Se | <0.002 | 0.0033 |
| Ag | <0.01 | <0.01 |

EXAMPLES 9–10

The procedure for Examples 1 to 5 was repeated with the exception that instead of Knoxville Clay, Merry Clay (montmorillonite based raw material available from Boral Brick's Merry Division, Augusta, Ga.) was used. The moisture content of the Merry Clay was adjusted to 20% moisture content. Table 8 presents the results from the extrusion process. Table 9 presents the properties of the resulting bricks.

EXAMPLES 11–12

The procedure for Examples 9 and 10 was repeated using Merry clay and lime precipitated iron-manganese colorant, as described above, in an amount of 5 and 10% by weight. Results are included in Tables 8 and 9.

COMPARATIVE EXAMPLE 13 (C13)

The procedure for Examples 9 and 10 was repeated using Knoxville clay with the exception that no iron-manganese colorant was added to the clay mixing before extruding the bricks or at any other time in the process. Comparison data is included in Tables 8 and 9.

TABLE 8

Extrusion Data For Merry Clay With Iron-Manganese Colorant

| Example | 9 | 10 | 11 | 12 | C13 |
|---|---|---|---|---|---|
| Iron-Manganese Colorant | C | C | L | L | none |
| Iron-Manganese Colorant, % | 5 | 10 | 5 | 10 | 0 |
| FRH Extruder Amps | 3 | 2.9 | 2.8 | 3.2 | 2.9 |
| Vacuum, in Hg | 25 | 22 | 22 | 22 | 29.5 |
| Penetrometer, kg/cm$^2$ | 1.7 | 1.4 | 1.6 | 1.2 | 2.1 |

TABLE 9

Properties of Bricks Prepared from Merry Clay with iron-manganese colorant fired at 1121° C.

| Example | 9 | 10 | 11 | 12 | C13 |
|---|---|---|---|---|---|
| Dry shrinkage, % | 6.7 | 6.4 | 6.4 | 6.6 | 6.5 |
| LF shrinkage, %[1] | 5.9 | 6.0 | 6.0 | 6.3 | 3.6 |
| CW absorption, %[2] | 4.8 | 7.3 | 4.5 | 5.3 | 4.8 |
| BW absorption, %[3] | 7.6 | 10.9 | 5.6 | 8.6 | 6.4 |
| C/B[4] | 0.63 | 0.67 | 0.80 | 0.61 | 0.75 |
| Bulk density, g/cc | 2.54 | 2.62 | 2.44 | 2.63 | 2.50 |
| Apparent porosity, % | 16.3 | 22.22 | 12.1 | 18.5 | 13.8 |
| MOR, lb/in 2[5] | 3284 | 2316 | 3668 | 3609 | 3858 |
| Color[6] | 3 | 3 | 3 | 3 | 0 |

EXAMPLE 14

A clay disk produced by a plastic pressing technique was used as the substrate for a clay slurry containing the iron-manganese colorant. The engobe was prepared by mixing iron-manganese colorant, carbonate precipitated, in an amount of 45 wt % based on the total composition, with brick clay (type M&D Clay, a product available from Kentucky-Tennessee Clay Co., Mayfield, Ky.), 15%, based on total weight of the composition, plastic clay (Knoxville clay, available from General Shale), 10 wt % based on the weight of the total composition, and water, 30 wt % to form an aqueous slurry. The slurry coating was applied to the surface of the clay disk using a small paint brush. The coated disk was subsequently fired at a temperature of 1066°–1121° C. Color observed after firing was jet black. The product exhibited a porous surface which is advantageous for mortar adhesion. The TCLP leaching test was employed on two engobe coated disks.

EXAMPLE 15

The procedure of Example 14 was followed with the exception of using iron-manganese colorant that was lime precipitated. After firing at 1066°–1121° C., the color observed was reddish-black.

TABLE 10

TCLP Data With Values Given In Parts Per Million

| | Example | |
|---|---|---|
| Metal | 14 | 15 |
| As | 0.0041 | 0.0145 |
| Ba | 0.233 | <0.10 |
| Cd | <0.01 | <0.01 |
| Cr | <0.05 | <0.05 |
| Pb | <0.05 | <0.05 |
| Hg | <0.9992 | <0.0002 |
| Se | <0.002 | <0.002 |

TABLE 10-continued

TCLP Data With Values Given In Parts Per Million

| | Example | |
|---|---|---|
| Metal | 14 | 15 |
| Ag | <0.01 | <0.01 |

DESCRIPTIONS OF ASTM TESTS

Dry shrinkage is determined as a percent and equals $[(L_o-L)/L_o] \times 100$; where $L_0$= original length and L= length in a dry condition.

Apparent porosity, P, (ASTM test C373–88) expresses as a percent, the relationship of the volume of the open pores of the specimen to its exterior volume. $P=[(M-D)/V] \times 100$. M= saturated mass; D= dry mass; V= exterior volume.

Bulk density, B, (ASTM test C373–88) is measured in grams per cubic centimeter. For a given specimen, bulk density is the quotient of the dry mass of the specimen divided by the exterior volume, including pores. B= D/V. (D and V are defined as above for apparent porosity.)

Linear firing shrinkage (ASTM test C531–85) provides information on linear changes taking place in the test materials between the time just after mixing and the time of complete curing. The specimens are not completely unrestrained during the initial curing period when most of the material's shrinkage occurs so the shrinkage measurements are most useful for comparative purposes rather than as absolute values. The procedure to determine linear firing shrinkage involves determining the length of a specimen by inserting it into a comparator which is a direct-reading dial micrometer. The specimen is heated to firing temperature to induce curing then cooled overnight at 22° C. before measuring. Linear shrinkage is determined as a percent and equals $[(L_o-L)/L_o] \times 100$; where Lo= original length and L= length measured after cure.

Absorption (ASTM test C67–91 ) is the weight of water picked up by a clay masonry unit during immersion at prescribed conditions expressed in relation to the dry weight of the unit. Absorption values are used in brick and tile standards as one factor in classifying these products into durability grades. Absorptions are indicators of the extent of firing during manufacture as well as being indicators of durability. The procedure of measuring absorptions follows. Specimens are dried in a ventilated oven at 110°–115° C. for a minimum of 24 hours and cooled and weighed. The process is repeated at 2 hour increment until the specimens achieve constant weight (less than 0.2% difference between successive weighings).

For the 24 hour cold water absorption, the dry, cooled specimen is submerged without preliminary partial immersion in clean water at 15.5°–30° C. for 24 hours. The specimen is removed; surface water is wiped off with a damp cloth and the specimen is weighed within 5 minutes of removing from the bath. Absorption is calculated as follows: Absorption, %= 100 (Ws−Wd)/Wd, where Wd= dry weight of the specimen and Ws=saturated weight of the specimen after submersion in cold water.

For the 5 hour boiled water absorption, the specimen that has been subjected to the cold water submersion is returned to the bath. The specimen is again submerged in the clean water at 15.5° to 30° C. in such a manner that water can circulate freely on all sides. The water is heated to boiling within 1 hour and is boiled continuously for 5 hours. The specimen is allowed to cool in the bath to 15.5°–30° C. by natural loss of heat. The specimen is removed, the surface water is wiped off with a damp cloth, and the specimen is weighed within 5 minutes of removing from the bath. Absorption is calculated as follows: Absorption, %= 100 (Wb−Wd)/Wd, where Wd= dry weight of the specimen and Wb= saturated weight of the specimen after submersion in boiling water.

Saturation coefficient (C/B) is the cold water absorption value divided by the boiled water absorption.

Modulus of rupture, S (ASTM test C67–91 ), is the maximum value of stress in the specimen at midspan which causes failure. S= 3 W1/2bd2, where S is measured in $kg/cm_2$ of lb/in 2 or Pax 10^4; W= maximum load indicated by the testing machine, lbf, kgf, or N; L= distance between the supports; b= average overall width, face to face, of the specimen; d= overall depth, bed surface to bed surface, of the specimen. The procedure involves supporting the test specimen flatwise on a span approximately 1 inch less than the basic unit length and loaded at midspan. If the specimen has recesses (panels or depressions) the specimen is placed so that such recesses are on the compression side. The load is applied to the upper surface of the specimen through a steel bearing plate 6.35 mm in thickness and 38.10 mm in width and of a length at least equal to the width of the specimen. The supports for the specimen need to be free to rotate in the longitudinal and transverse directions of the specimen and adjusted so they exert no force in these directions. The rate of loading does not exceed 8896 N (2000 lbf) per minute but this requirement may be considered as being met if the speed of the moving head of the testing machine immediately prior to application for the load is not more than 1.27 mm/min (0.05 in/min).

Having thus described and exemplified the invention with a certain degree of particularity, it should be appreciated that the following claims are not to be limited but are to be afforded a scope commensurate with the wording of each element of the Claims and equivalents thereof.

It is claimed that:

1. A process for preparing an iron-manganese colorant having an effective amount of iron and manganese present to impart color to building materials, comprising the steps of:
   (a) recovering precipitates comprising metal carbonates, metal hydroxides, metal hydrated oxides and mixtures thereof from an aqueous media containing metal ions wherein a single source of the iron and manganese is derived from a titanium chlorination process;
   (b) dewatering the precipitates.

2. The process of claim 1 wherein dewatering the precipitates is a two-step separation comprising sequentially,
   (i) separating the precipitates from the water to produce precipitates having a solids content of about 30 to about 70%;
   (ii) washing;
   (iii) separating the precipitates from the water to produce precipitates having a solids content of about 30 to about 70%.

3. The process of claim 2 wherein the separating is carried out with a centrifuge to a solids content of about 40 to about 65%.

4. The process of claim 1 wherein step (b) is carried out by filtering with plate and frame filter membrane presses to a solids content of about 50 to about 60%.

5. The process of claim 1 or claim 2 or claim 3 or claim 4, further comprising the step of:
   (c) drying to a solids content of about 75 to about 85%.

6. A process for coloring brick comprising admixing the iron-manganese colorant produced from claim 1 with brick clay.

7. The process of claim 6 further comprising mixing ball clay and water with the iron-manganese colorant and brick clay to form an engobe.

* * * * *